United States Patent
Yan et al.

(10) Patent No.: US 11,308,130 B1
(45) Date of Patent: *Apr. 19, 2022

(54) CONSTRUCTING GROUND TRUTH WHEN CLASSIFYING DATA

(71) Applicant: Amperity, Inc., Seattle, WA (US)

(72) Inventors: Yan Yan, Seattle, WA (US); Stephen Meyles, Seattle, WA (US); Mona Akmal, Seattle, WA (US); Michael P. Fikes, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 258 days.

This patent is subject to a terminal disclaimer.

(21) Appl. No.: 16/678,841

(22) Filed: Nov. 8, 2019

Related U.S. Application Data (63) Continuation of application No. 15/729,960, filed on Oct. 11, 2017, now Pat. No. 10,509,809.

(51) Int. Cl.
| | |
|---|---|
| *G06F 7/02* | (2006.01) |
| *G06F 16/00* | (2019.01) |
| *G06F 16/28* | (2019.01) |
| *G06N 20/00* | (2019.01) |
| *G06F 16/22* | (2019.01) |
| *G06N 7/02* | (2006.01) |
| *G06F 16/35* | (2019.01) |

(52) U.S. Cl.
CPC .......... *G06F 16/285* (2019.01); *G06N 20/00* (2019.01); *G06F 16/2228* (2019.01); *G06F 16/355* (2019.01); *G06N 7/02* (2013.01)

(58) Field of Classification Search
CPC . G06T 2007/20076; G06T 2207/20081; G06F 16/285; G06F 16/2228; G06F 16/355; G06F 16/35; G06N 20/00; G06N 3/08; G06K 9/6267; G06K 9/46
See application file for complete search history.

(56) References Cited

U.S. PATENT DOCUMENTS

| | | | |
|---|---|---|---|
| 7,783,106 B2 * | 8/2010 | Cooper | G11B 27/28 382/173 |
| 9,576,248 B2 | 2/2017 | Hurwitz | |
| 10,127,229 B2 * | 11/2018 | Schijvenaars | G06F 16/353 |
| 2006/0107216 A1 * | 5/2006 | Cooper | G06F 16/7847 715/724 |
| 2013/0325759 A1 | 12/2013 | Rachevsky | |
| 2014/0280146 A1 | 9/2014 | Wood et al. | |
| 2017/0132866 A1 * | 5/2017 | Kuklinski | G07D 7/2083 |
| 2018/0322394 A1 | 11/2018 | Nguyen | |

* cited by examiner

*Primary Examiner* — Bruce M Moser
(74) *Attorney, Agent, or Firm* — George David Zalepa; Greenberg Traurig, LLP (57) ABSTRACT

The present disclosure relates to evaluating whether two data records reflect the same entity using a classifier in the absence of ground truth. Without ground truth, it is difficult to determine the precision or recall of a classifier. The present disclosure generates a list comprising a series of unique feature signatures and a set of sample record pairs for each unique feature signature. In some embodiments, users may provide labels for the set of sample record pairs for each unique feature signature.

20 Claims, 9 Drawing Sheets

| Pairs Compared | F1 | F2 | F3 | F4 | F5 |
|---|---|---|---|---|---|
| record 00004 <--> record 99999 | T | T | F | T | F |
| record 00078 <--> record 39532 | T | T | F | T | F |
| record 00338 <--> record 24344 | T | T | F | T | F |
| record 00893 <--> record 34223 | T | F | F | T | F |

...

| record 78989 <--> record 88921 | T | T | F | T | F |
| record 67382 <--> record 99999 | T | T | T | F | F |

FIG. 5

| Feature Signature | Numer of Occurrences | Percentage of Occurrence | First Sample Pair | Second Sample Pair | Third Sample Pair |
|---|---|---|---|---|---|
| TTFTF | 309 | 44.1% | record 00094 <--> record 99432 | record 00078 <--> record 39532 | record 00338 <--> record 24344 |
| TFFTF | 103 | 14.7% | record 00893 <--> record 34223 | record 03893 <--> record 21923 | record 09232 <--> record 52511 |
| TTTFF | 95 | 13.6% | record 33392 <--> record 60119 | record 49223 <--> record 50393 | record 67382 <--> record 99999 |
| ... | | | | | |
| FTTTF | 3 | .4% | record 09323 <--> record 72102 | record 10002 <--> record 89992 | record 83232 <--> record 93230 |
| FFTTF | 3 | .4% | record 33421 <--> record 69113 | record 52022 <--> record 77729 | record 67882 <--> record 78922 |

| Feature Signature | Weight | True Positives | False Positives | False Negatives |
|---|---|---|---|---|
| TTFTF | 44.1% | 3 | 0 | 0 |
| TFFTF | 14.7% | 3 | 0 | 0 |
| TTTFF | 13.6% | 2 | 0 | 1 |
| ... | ... | ... | ... | ... |
| FTTTF | .4% | 2 | 1 | 0 |
| FFTTF | .4% | 0 | 2 | 1 |

| Sample Pairs | Label |
|---|---|
| record 00094 <--> record 99432 | match |
| record 00078 <--> record 39532 | match |
| record 00338 <--> record 24344 | match |
| record 00893 <--> record 34223 | match |
| record 03893 <--> record 21923 | match |
| record 09232 <--> record 52511 | match |
| record 33392 <--> record 60119 | no match |
| ... | ... |
| record 67882 <--> record 78922 | no mtch |

CONSTRUCTING GROUND TRUTH WHEN CLASSIFYING DATA

CROSS REFERENCE TO RELATED MATTERS

This application is a continuation of U.S. patent application Ser. No. 15/729,960 filed Oct. 11, 2017, which is hereby incorporated by reference in its entirety.

BACKGROUND

In the field of computing, there may be large amounts of data that need to be classified into categories. Classifiers or similar computing modules operate by searching for commonalities in data structures or attributes within an input dataset. Classifiers are configured according to classification rules. They may also be trained using known input data. For example, a classifier may be designed to classify the genre of a piece of music by analyzing an audio file. To train this classifier, a user inputs audio files of a known genre such as "jazz" along with an indication that the input audio files are "jazz." To this end, the classifier can learn how to classify "jazz" by analyzing an audio file that is known to be "jazz." The knowledge that a particular audio file should be classified as "jazz" is called "ground truth."

Ground truth allows for classifiers to be trained to ensure the classifier is reliable in terms of precision and recall. The present disclosure describes classifying data when there is no ground truth.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to classifying data in the absence of ground truth. Ground truth refers to the knowledge that a piece of data accurately represents a real-world entity such as a physical person, place, or thing. In the computing world a real-world entity can be represented as a record containing information about the real-world entity, such as attributes about the real-world entity. For example, there could be an individual who is "John Doe" and who is an entity that is part of the real-world. In the computing world, a record may be stored to represent this real-world entity. In addition, there could be three different records that include the names "John Doe," "Jonathan Doe," and "J. Doe," respectively that all represent the same person. Or, these records might represent different individuals named "John Doe." Therefore, there is a link between a particular record and the real-world entity (e.g., the person, John Doe) that it purports to represent. Ground truth refers to knowledge as to whether that link is accurate or not.

The present disclosure describes a software application that generates data to validate the performance of a classifier or to train a classifier in the absence of ground truth. The software application performs a number of comparisons, identifies a signature for each comparison, generates output data that includes a limited, representative sample of signatures, and validates a classifier using the output data and user data. The following figures provide a detailed explanation of various embodiments of the present disclosure.

Figure 1:
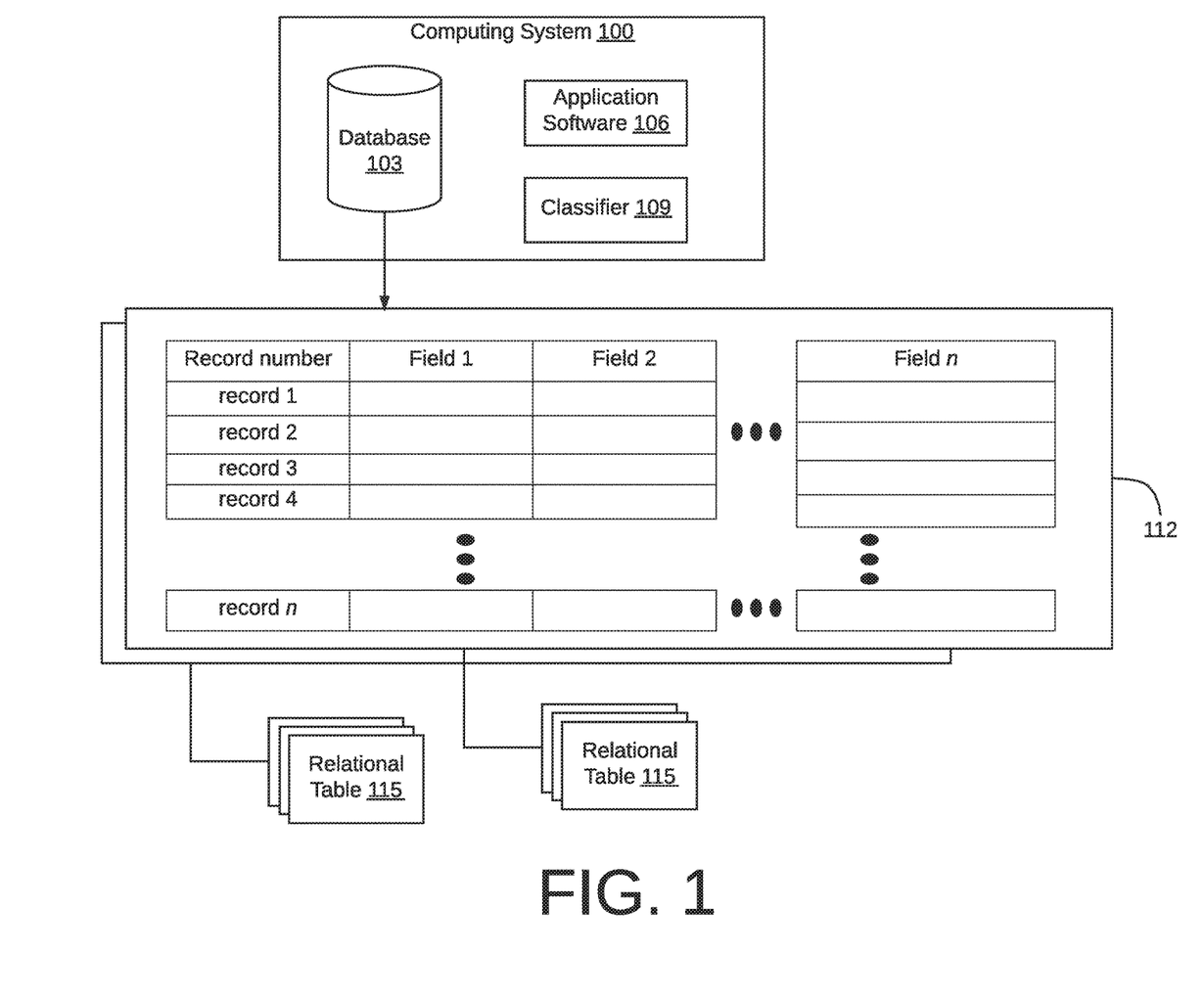
FIG. 1 is a drawing of a computing system 100 according to various embodiments of the present disclosure.

FIG. 1 shows a computing system 100 according to various embodiments. The computing system 100 is made up of a combination of hardware and software. The computing system 100 includes a database 103, a software application 106, and a classifier 109. The computing system may be connected to networks such as the Internet, intranets, extranets, wide area networks (WANs), local area networks (LANs), wired networks, wireless networks, or other suitable networks, etc., or any combination of two or more such networks.

The computing system 100 may comprise, for example, a server computer or any other system providing computing capability. Alternatively, the computing system 100 may employ a plurality of computing devices that may be arranged, for example, in one or more server banks or computer banks or other arrangements. Such computing devices may be located in a single installation or may be distributed among many different geographical locations. For example, the computing system 100 may include a plurality of computing devices that together may comprise a hosted computing resource, a grid computing resource and/or any other distributed computing arrangement. In some cases, the computing system 100 may correspond to an elastic computing resource where the allotted capacity of processing, network, storage, or other computing-related resources may vary over time. The computing system may implement one or more virtual machines that use the resources of the computing system 100.

Various applications and/or other functionality may be executed in the computing system 100 according to various embodiments. Also, various data is stored in the database 103 or other memory that is accessible to the computing system 100. The database 103 may represent one or more databases 103.

The data stored in the database 103 includes one or more database tables 112. A database table 112 includes several records, where each record has one or more corresponding fields. A database table 112 may be linked or otherwise associated with one or more relational tables 115. The components executed on the computing system 100 include a software application 106 and a classifier 109, which may access the contents of the database 103. When stored in a relational database, a database table 112 may be linked to one or more relational tables 115. For example, if an airline company maintained a database table 112 that stored customer records, there may be a relational table 115 storing the flight history for each customer. The contents of the relational table 115 link to a corresponding record.

Next, a general description of the operation of the various components of the computing system 100 is provided. Various businesses or other entities utilize the computing system 100 to store information in a database. For example, businesses may want to store records reflecting customers, products, transactions, events, items, or any other piece of information relevant to the business. Records are collected over time and stored in one or more database tables 112. For example, when a business gets a new customer, a software program may create a record reflecting the new customer. This record may include the customer's name, address, contact information, or any other information that identifies the customer. Such information is stored as fields within a database table 112.

In practice, a single record is sufficient to represent a customer. However, it is possible that duplicate or redundant records are inadvertently or unintentionally created and/or exist within the database 103. For example, a customer may register with a business via an online portal which creates a customer record for that customer. Later, the same customer may inadvertently register again with the online portal, thereby creating a redundant customer record. As another example, two businesses maintaining their own customer records may merge such that the same customer may exist in two different database tables 112. The resulting merged database table 112 could have redundant records.

Because multiple records may represent the same real-world entity, it is desirable to group related records together. A classifier 109 may be used to determine whether two records should be classified as a match based on the degree of common features between the two records. The classifier 109 may be a binary classifier that determines whether a pair of records reflect the same entity or whether they do not reflect the same entity. A record pair (i.e., two records being compared) are considered to be a related pair if they reflect the same entity or an unrelated pair if they do not. A classifier 109 may make decisions based on a threshold level of similarity. For example, based on the degree that two records share similar field values, the classifier 109 could output a binary result (e.g., yes or no) that the two records are similar enough to be deemed a related pair.

When ground truth is known, it is easy to verify whether the classifier 109 is accurate. For example, a classifier 109 may be configured to determine whether a digital image represents a picture of a particular individual. Here, a picture is inputted into the classifier 109 and a yes-no result is provided. Because a user knows the truth by examining the picture, the performance of the classifier 109 may be evaluated. The present disclosure addresses the issue of classifying data when ground truth is not known or practically unknowable. This case may arise when classifying data where a user does not know the truth or cannot readily ascertain the truth. For example, a user may compare two records to determine whether they represent the same entity without knowing how to verify the result. This also becomes problematic when dealing with a large quantity of records and classifications to make. Here, it may be impractical to classify large sets of data.

According to various embodiments, the software application 106 of the present disclosure operates by generating signatures (discussed in further detail below) by comparing pairs of records within a sample set of pairs, generating output data. Different combination of record pairs from a set of records form the sample set of pairs. For example, if a set of records includes records A, B, and C, then the sample set of pairs may be A-B, A-C, and C-B. The output data includes a list of unique signatures, as well as corresponding record pairs limited to a predetermined sample size for each signature. Users may then provide input by labelling the output data. This may involve indicating a classification for the sampled record pairs. For example, a user may provide a label indicating whether each record pair in the output data is a match or no-match. Labeled data is used to establish ground truth. Based on this user data, the software application 106 may quantify the performance of the classifier 109 by calculating a precision value or recall value. Furthermore, the software application may weight each signature according to its frequency of occurrence in a sample set of pairs when quantifying the precision or recall of the classifier 109. In addition, the user input may be used to train the classifier 109 to improve its performance.

Figure 2:
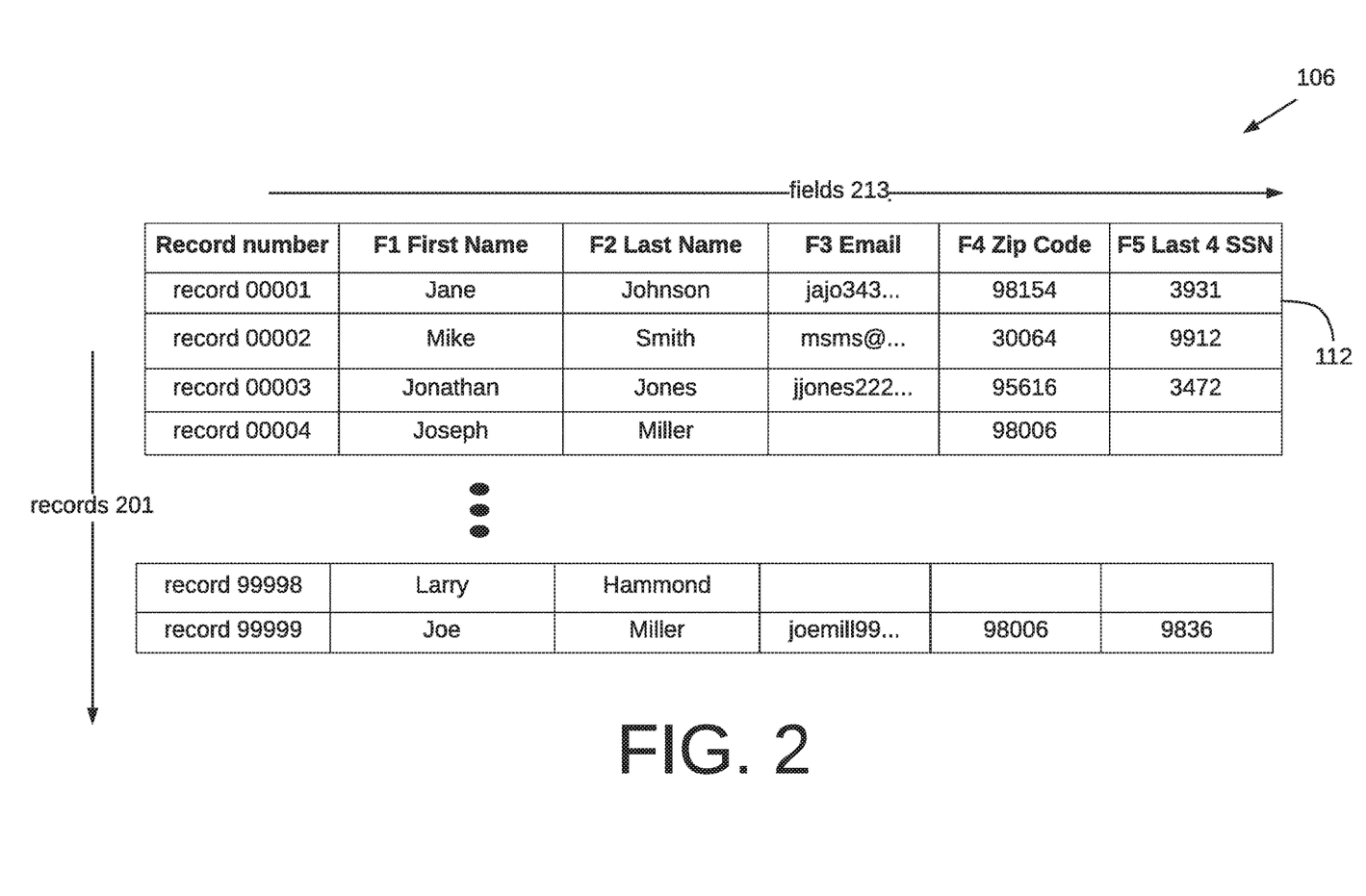
FIG. 2 is an example of a database table 112 of FIG. 1 according to various embodiments of the present disclosure.

FIG. 2 shows an example of a database table 112 of FIG. 1 according to various embodiments of the present disclosure. A database table includes one or more records 201, where each record has one or more fields 213. A record 201 may or may not have all its fields 213 populated. Each record 201 is intended to be dedicated to a real-world entity. For example, "record 0001" is intended to be the record representing an individual named "Jane Johnson." "Record 2" is intended to be the record for "Mike Smith" and so on. The example in FIG. 2 includes 99,999 records and five fields, although any number of records 201 and fields 213 may be used in a manner consistent with the present disclosure.

In various embodiments, the fields 213 are semantic fields such that they are normalized across a several database tables 112. For example, one database table 112 may have its F2 field originally called "last_name" while a different database table 112 may have its F2 field originally called "surname." By using semantic fields, various database tables 112 conform to a universal format of identifying its fields. This way, the software application 106 (FIG. 1) understands that the "last_name" field of one database table 112 maps to the "surname" field of a different database table 112. The database 103 (FIG. 1) may store a lookup table that maps original fields to semantic fields in order to normalize the fields across multiple database tables 112.

As discussed in further detail below, two records are compared to determine if the records should be classified as a related pair or unrelated pair. To compare two records, field values among the pair of records are compared. For example, in one embodiment, the value of F1 of first record is compared to the value of F1 of a second record, then the value of F2 of the first record is compared to the value of F2 of the second record, and so on. The comparison of two values yields a feature with respect to the record pair. A feature is a programmed calculation taking as inputs M records and/or other data such as external metadata and returning a numeric value as output. The variable M=2 in the case of handling a record pair. That numeric output may be, for example, a real value bounded between 0 and 1, or a binary value with two distinct outputs, with 0 being considered "false" and 1 being considered "true." A feature score is the specific output value generated by a feature for a given set of records or record pair.

For example, comparing F1 of record 00004 ("Joseph") to F1 of record 99999 ("Joe") may yield a "first name feature" having a feature score of 0.88 on a scale of 0 to 1, where 0 means no-match and 1 means a perfect match. In other embodiments, the first name feature with respect to record values "Joe" and "Joseph" may be a binary value of "true/T" meaning there is a match. For purposes of illustration the present disclosure uses binary values to represent features, however, it should be appreciated that a non-binary value may be used as a feature.

In other embodiments, a subset of field values may be compared to a corresponding subset of field values. For example, the combination of field values F1 and F2 of a first record may be compared to the combination of field values F1 and F2 of a second record. The comparison may involve concatenating the values of F1 and F2 as well as concatenating the transposed values of F1 and F2. This way F1 and F2 of a first record is compared to F1 and F2 of a second record, as well as F2 and F1 of the second record. The resulting feature with respect to a set of fields may account for whether there is a match between fields' values when they are transposed. As an example, "John Doe" compared to "John Doe" may yield a value of 'true' for the "Names Matched" feature while "John Doe" compared to "Doe John" may yield a value of 'true' for the "Transposed Names Matched" feature.

Figure 3:
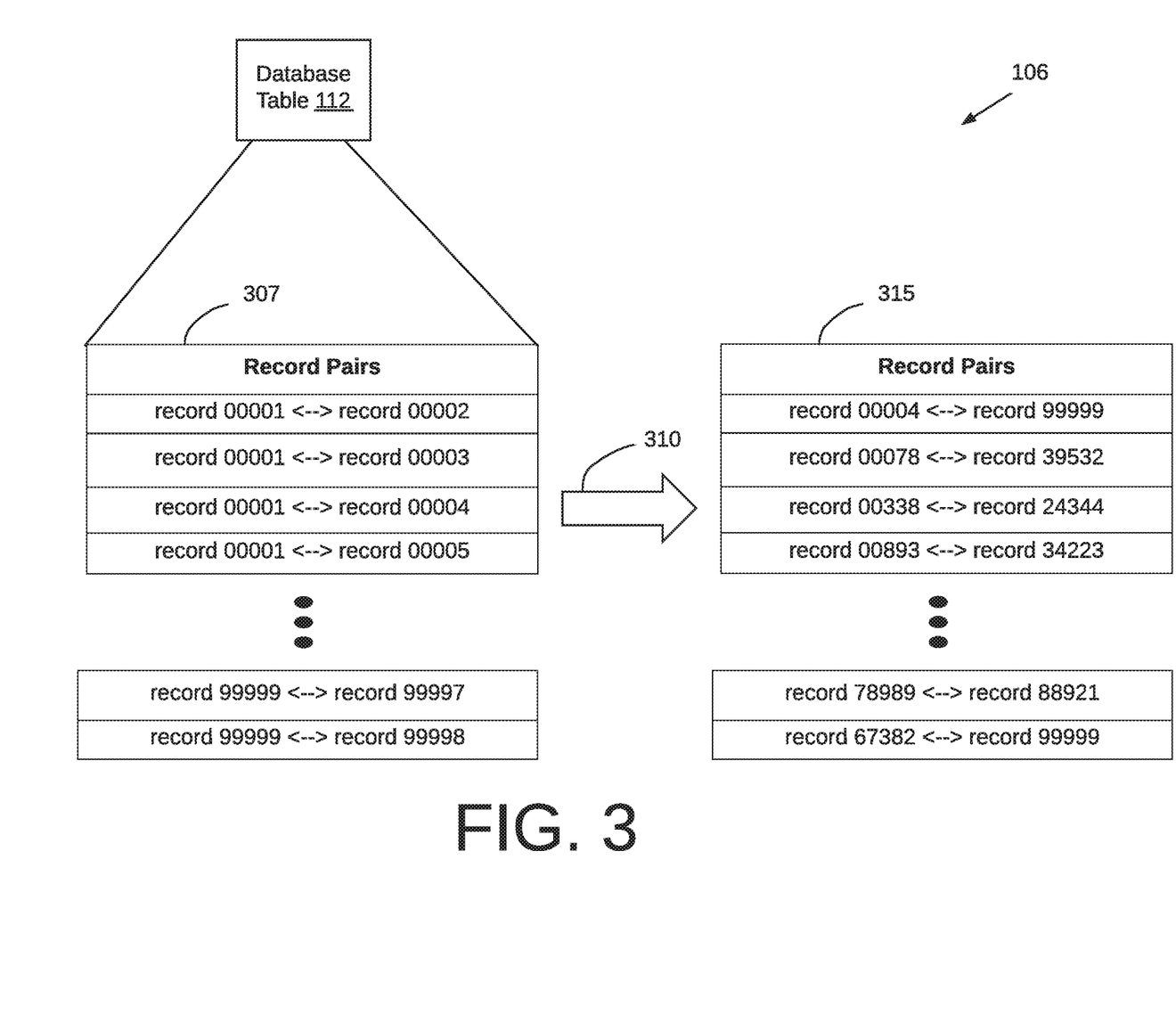
FIG. 3 is an is an example of a filtered database table 112 of FIG. 2 according to various embodiments of the present disclosure.

FIG. 3 is an example of a filtered database table 112 of FIG. 2 according to various embodiments of the present disclosure. The records 201 (FIG. 2) in the database table 112 may be organized into a set of record pairs 307 (also referred to a set of unfiltered records pairs) having different combinations of records 201. The number of record combinations may be large. FIG. 3 shows how the 99,999 records of FIG. 2 may be filtered down to a much smaller set of related record pairs that are likely to be classified as record pairs. This is done by performing a plurality of blocking functions 310. The result is a filtered set of pairs 315 that include pairs that have a relatively higher chance of being related pairs. The blocking functions reduces the number of pairs that need to be processed, thereby requiring fewer processing resources for analyzing related pairs. Assuming there are 99,999 records, the number of pairs to consider, without applying a blocking function is 4,999,850, 001, which is calculated according to the formula:

$$n*(n-1)/2$$

where n is the number of records.

The purpose of a blocking function 310 is to coarsely select record pairs that share some related information and which could represent the same real-world entity. For example, a blocking function 310 may operate to determine if two records 201 are sufficiently similar enough where they might be classified as a related record pair. This may involve determining which field values are similar or are the same. One example of a blocking function 310 is to compare a "social security number (SSN)" field. Two records 201 having the same SSN field values likely means that the two records form a related pair. Another example of a blocking function 310 is to compare the first three characters of a first name field and first three characters of a last name field between two records. By performing a plurality of blocking operations 310, a relatively large set of records is reduced in size to include an over-inclusive set of records that are likely to be a part of a related pair.

Figure 4:
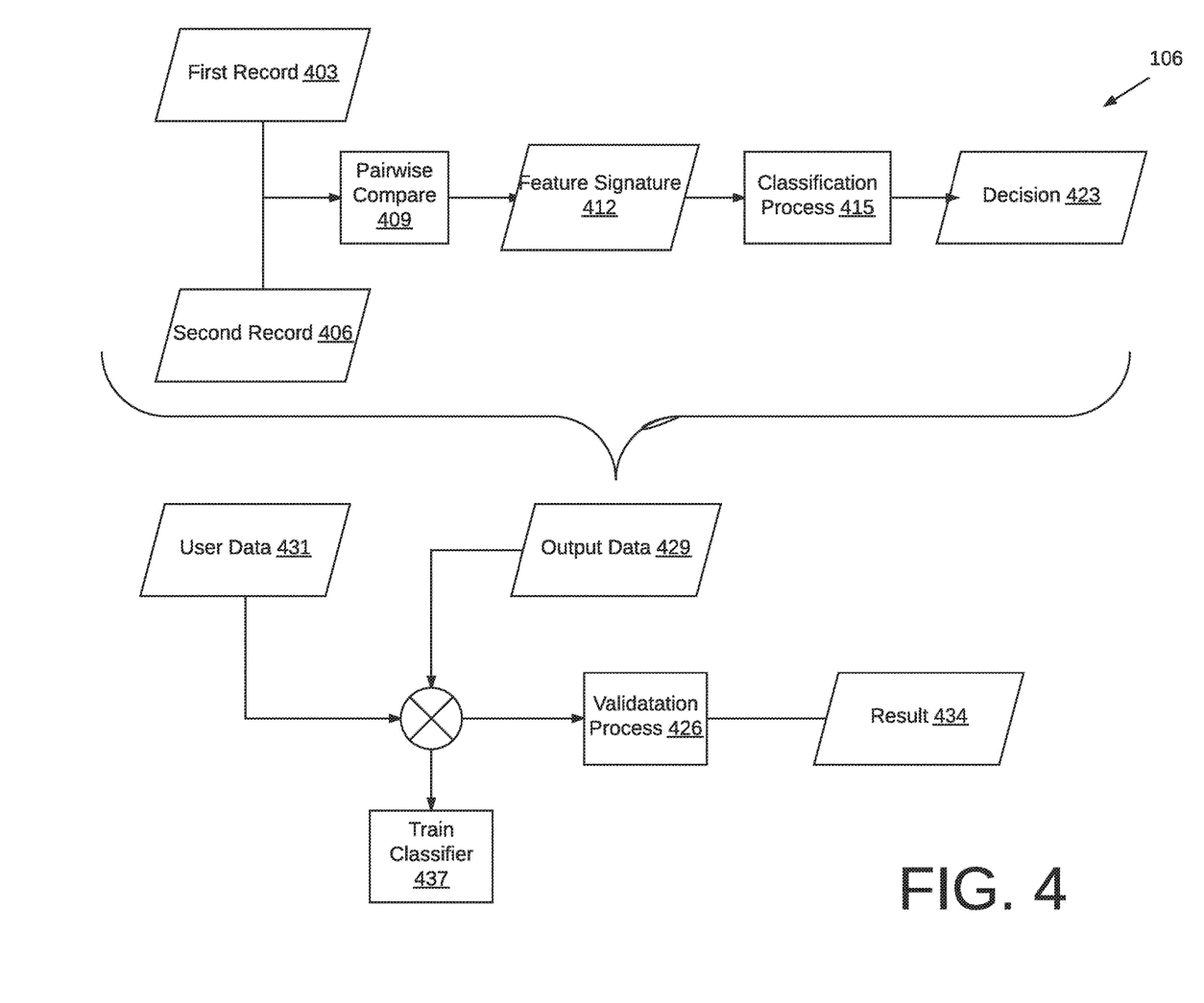
FIG. 4 is an example of operations performed by the software application executing within the computing system 100 of FIG. 1 according to various embodiments of the present disclosure.

Referring next to FIG. 4, which is an example of operations performed by the software application 106 executing within the computing system 100 of FIG. 1 according to various embodiments of the present disclosure. The software application 106 is configured to identify pairs within a set of records. The set of records may be filtered down by way of a blocking operation 310 (FIG. 3) to yield a filtered set of pairs 315.

The software application 106 selects a record pair made up of a first record 403 and a second record 406 among a set of records to perform a pairwise comparison 409. Once a record pair is selected, the software application performs a pairwise comparison 409. This may involve comparing the field values between the two records 403 and 406 to determine a feature for a particular field or set of fields. The pairwise comparison 409 generates a feature signature 412 which may be made up of various features of the fields' values being compared.

The feature signature 412 reflects how two records are similar or dissimilar based on the extent the field values are similar. In other words, the feature signature 412 corresponds to a series of features between a pair of records being compared. Two different record pairs may have the same feature signature 412 even though they represent different entities. In this case, it is inferred that the records in the first pair are similar in the same way they related to one entity as records in the second pair relate to a different entity. For example, given the trivial set of binary features "Fuzzy Last Name match" and "Fuzzy First Name match", the record pair {"Stephen Meyles", "Steve Myles"} will generate a feature signature of [1 1], where "1" refers to a binary value indicating a match. In addition, a record pair of {"Derek Slager", "Derke Slagr"} will also generate a feature signature 412 of [1 1]. This does not necessarily mean that the first pair of records are related to the same real-world identity as the second pair of records. Instead it suggests that the records have the same data variations (fuzzy matches of first and last name). Records with the same data variations may have the same signature. This is discussed in further detail with respect to FIG. 5.

After generating the feature signature 412, the software application 106 uses a classifier 109 (FIG. 1) to perform a classification process 415 on the feature signature 412. The classification process calculates a classification score that correlates to the strength that a particular feature signature indicates a match. For example, a score of 0 means no-match while a score of 1 means a perfect match. After calculating a classification score, the classifier 109 compares the classifications score to a predetermined threshold score to yield a decision 423 that classifies the feature signature 412. According to various embodiments, the decision 423 is a binary value that indicates if the feature signature 412 reflects a match or no match. A pair that is classified as a match is deemed a related pair while a pair that is classified as a no-match is deemed an unrelated pair. This process above may process pairs in batches until all record pairs within a set of pairs is processed. Each pairwise comparison 409 is subject to a classification process 415 that generates a respective decision 423.

The software application 106 generates output data 429. The output data 429 may include a list of unique feature signatures 412 along with corresponding record pairs limited to a predetermined sample size for each unique feature signature 412. Accordingly, the record pairs are selected to represent a diverse set of feature signatures 412. The record pairs of the output data 429 may be submitted to a user who then provides user data 431 such as labels for record pairs.

Output data 429 combined with user data 431 may be used to evaluate a classifier 109 and to estimate ground truth for various feature signatures 412. This is discussed in more detail with respect to FIG. 7.

When configuring the classifier 109, it may be desirable to validate the classifier 109. This ensures that the classifier 109 is accurately classifying the feature signature 412 to determine whether two records should be considered a related pair or unrelated pair. The software application 106 may perform a validation process 426 by analyzing user data 431 in the absence of actual ground truth. The software application performs a validation process 426 by analyzing the output data 429 and generating a result. The result quantifies the performance of the classifier 109 by calculating a precision value and/or a recall value. In addition, the user data 431 may include labels for the record pairs represented by a diverse group of feature signatures 412. The labeled record pairs may be used for classifier training 437.

Figure 5:
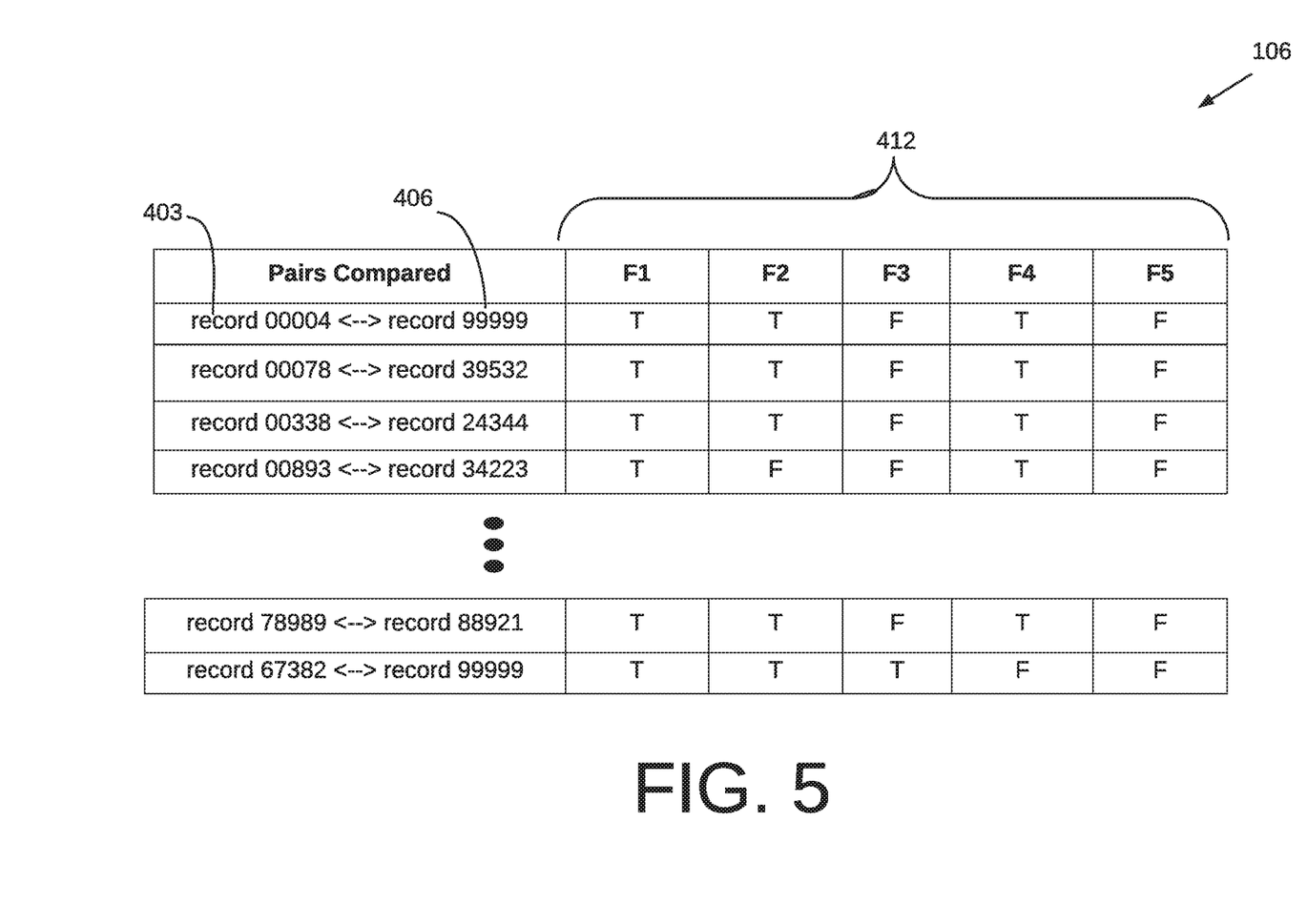
FIG. 5 is an example of data generated by performing pairwise comparisons in the computing system 100 of FIG. 1 according to various embodiments of the present disclosure.

FIG. 5 provides an example of data generated by performing pairwise comparisons 409 in the computing system 100 of FIG. 1 according to various embodiments of the present disclosure. The software application 106 may generate the data shown in FIG. 5 by performing a number pairwise comparisons 409 (FIG. 4) on a set of record pairs to generate corresponding feature signatures 412. The data in FIG. 5 identifies a first record 403 and a second record 406 that are subject to a pairwise comparison 409. The data also includes a feature signature 412 that is generated in response to the pairwise comparison 409 (FIG. 4).

The feature signature 412 may indicate which features between two or more records are the same. FIG. 5 provides an example of comparing single fields, however, a feature may reflect a comparison between two or more fields. The example of FIG. 5 uses a "T" for true to indicate that the field values between two records is the same and uses an "F" for false if the field values between two records are not the same. As shown in FIG. 5, a pairwise comparison 409 between record 00004 and record 99999 yields a feature signature of "TTFTF." In this example, when comparing a field value to a null value, the resulting feature is "F." The example of FIG. 5 shows how records having five fields are being compared. When records have more fields, then a larger variety of feature signatures 412 can exist.

The feature signature 412 of FIG. 5 is based on the following set of features: "fuzzy_first_name_match", "fuzzy_last_name_match", "email_match," "zip_code_match", and "last_4_SNN_digits_match." It should be appreciated that other features may be used to generate the feature signature 412 such as "Transposed_names match," which compares concatenated values of F1 and F2 of one record to concatenated values of F2 and F1 of a second record. In addition, the feature signature 412 may include a feature such as "first_name_match," which requires an identical match rather than a fuzzy match. Another example is a feature based on the concatenation of the first three characters of a first name and the first three characters of the last name. Here "Josh Mills" compared to "Joseph Miller" would generate a feature score of "True/1" because both have the same feature of "JOS-MIL", which results from the concatenation of the first three characters of the first name and the first three characters of the last name.

Instead of using binary feature values, feature values may be non-binary such as "exact-match," "approximate-match," "non-conflicting," and "unlike." Here, "exact-match" refers to the case where field values between two records are identical and "approximate-match" refers to field values that are sufficiently similar such as "Jon" and "Jonathan." A "non-conflicting" feature refers to a case where a field value is compared against a null field value. And "unlike" refers to values that are sufficiently dissimilar such as "Steve" and "Jon." More detailed or complex feature values may result in a larger variety of feature signatures. Thus, while the feature signature 412 of FIG. 5 uses features having binary values, other embodiments may use non-binary values.

The classifier 109 (FIG. 1) computes a classification score on a feature signature 412 and then compares that classification score to a threshold score to determine whether the feature signature 412 corresponds to a pair of records that are related or unrelated. A feature score of "TTTTT" would yield a perfect score and therefore classify a record pair having that feature signature as a related pair.

Based on how a classifier 109 is configured, the classifier 109 may determine that a feature signature "TTFTF" should be classified as a match. Accordingly, record 00004 and record 99999 would be considered a related pair and thus, indicative of the same real-word entity. Using the example of FIG. 3, the "Joseph Miller" of record 00004 and the "Joe Miller" of record 99999 are considered to represent the same individual, who, in the real world, is a person named "Joe Miller" or "Joseph Miller." In the example of comparing record 00004 to record 99999, a "fuzzy_first_name_match" field" yielded a "True/T" as a result of comparing "Joe" to "Joseph." A "fuzzy_first_name_match" feature relates to whether the first names are identical or substantially identical by applying a fuzzy string comparison algorithm. In addition, the "fuzzy_last_name_match" feature yielded a "True/T" because both last name field values are equal or substantially equal. An "email_match" feature yielded a "False/F" because record 00004 has a null value while record 99999 does not. A "zip_code_match" yielded a "True/T" because both zip codes are identical. And a "last_4_SSN_digits_match" yielded a "False/F" because 99999 has a null value while record 00004 does not. By combining these feature scores, the resulting feature signature is "TTFTF."

When analyzing a relatively large set of records, some feature signatures 412 may be more common than others. To improve validation of the classifier 109, a variety of feature signatures 412 should be evaluated regardless of how commonly they occur. The present disclosure describes generating output data 429 (FIG. 4) to assist in evaluating the classification process 415 (FIG. 4).

Figure 6:
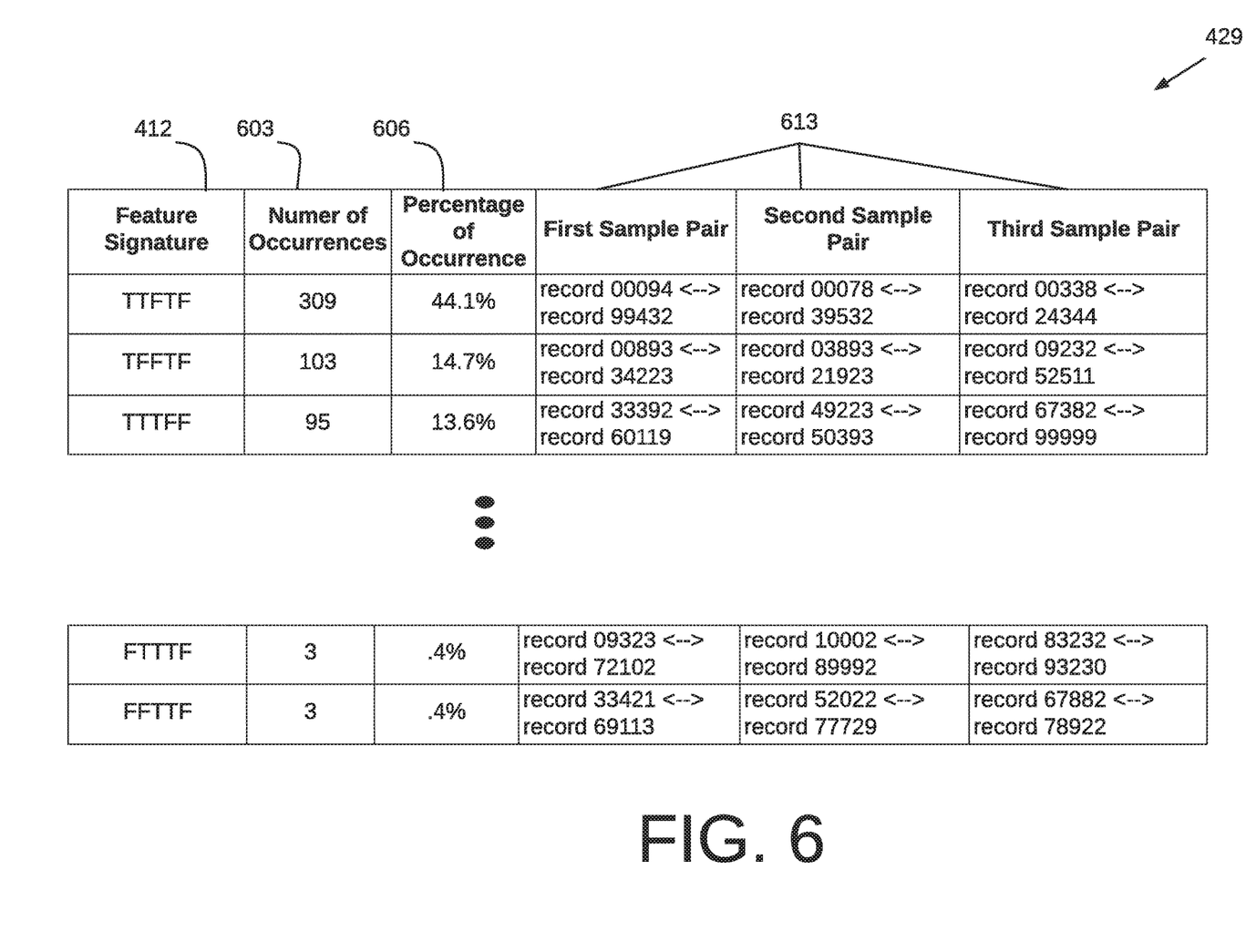
FIG. 6 is an example of output data generated in the computing system 100 of FIG. 1 according to various embodiments of the present disclosure.

Next, FIG. 6 provides an example of output data 429 generated in the computing system 100 of FIG. 1 according to various embodiments of the present disclosure. The output data 429 lists the feature signatures 412 resulting from performing pairwise comparisons 409 (FIG. 4) on a set of records. The list uniquely identifies feature signatures 412 by avoiding duplicative listings of the feature signatures 412. For a given feature signatures 412, the output data may identify the frequency of occurrence 603 of the given feature signature 412, a percentage of occurrence 606 of the given feature signature 412, and a limited set of sampled record pairs 613 for the given feature signature 412.

The output data 429 indicates how often a particular feature signature 412 occurs within a set of records. The output data includes a sample set of record pairs 613 representing each feature signature 412. According to various embodiments, the output data 429 limits the sample size to a predetermined size. The example of FIG. 6 uses a predetermined size of three so that for each feature signature 412 there are three identified sample pairs. The sample set of record pairs 613 may be sampled randomly. Alternatively, the sample set of record pairs 613 are identified according to sequentially processing the set of records. For example, when a feature signature 412 is generated as shown in FIG. 4, the software application 106 (FIG. 1) writes the corresponding pair into the output data 429 for the particular feature signature 412. This will continue each time the software application 106 encounters the same feature signature 412 up until the predetermined sample size is reached. After that, no more record pairs are written as output data 429. In other embodiments, the software application 106 computes the feature signatures 412 for the entire set of records and then selects k samples for each distinct feature signature, where k is the predetermined sample size.

The example of FIG. 6 shows that the feature signature 412 of "TTFTF" occurs most frequently relative to other feature signatures 412. Instead of documenting each record pair for a given feature signature 412, the output data 429 limits the sample size to generate the sample set of record pairs 613. Moreover, randomly sampling record pairs from the set of records without limitation will likely yield more record pairs having a feature signature 412 of "TTFTF" over any other feature signature 412. This makes it more difficult to evaluate the full spectrum of feature signatures 412.

Figure 7:
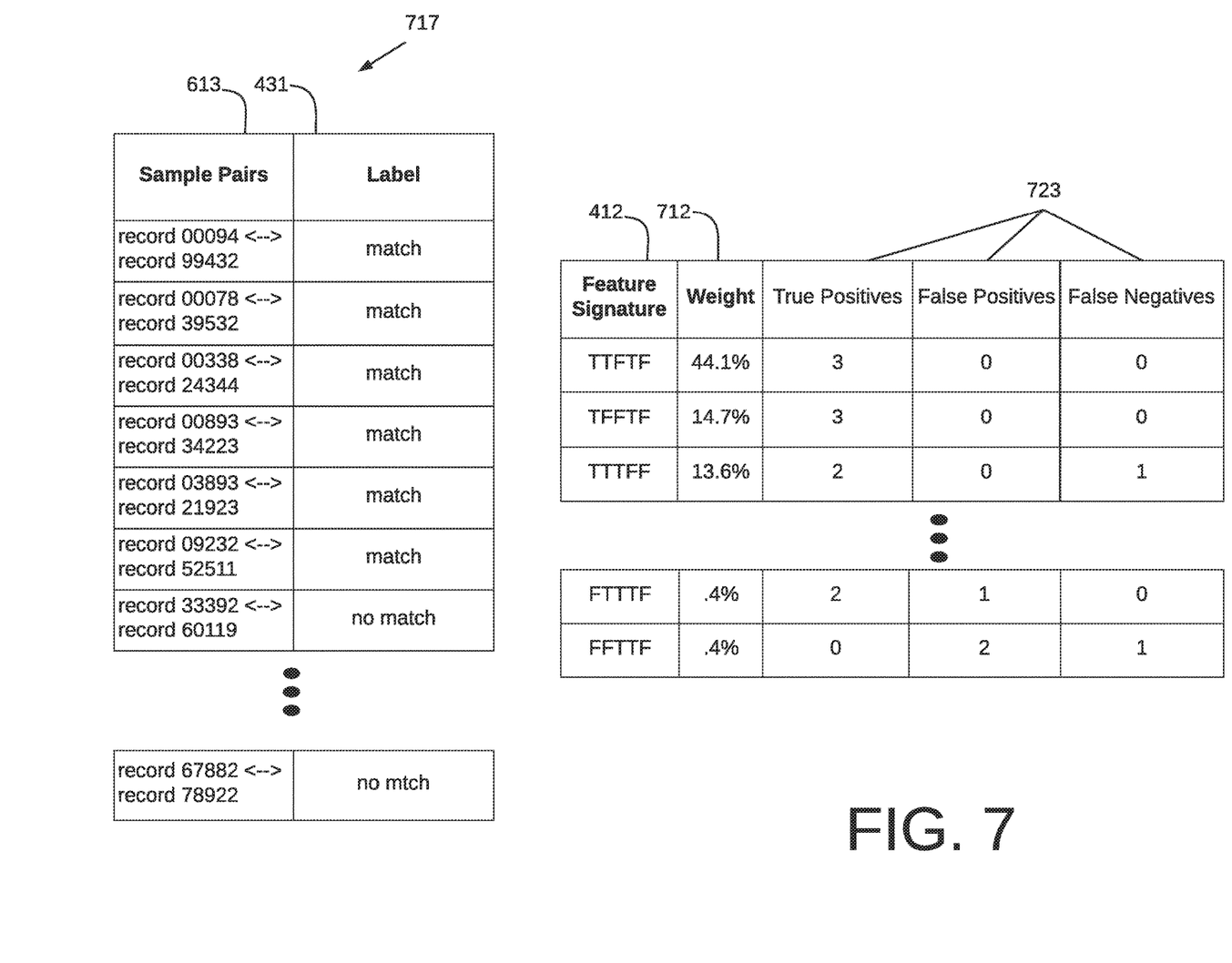
FIG. 7 is an example of user data used in the computing system 100 of FIG. 1 according to various embodiments of the present disclosure.

FIG. 7 provides an example of user data 431 used in the computing system 100 of FIG. 1, according to various embodiments of the present disclosure. After the software application 106 (FIG. 1) generates output data 429 (FIGS. 4 and 6), a user may analyze the sample set of record pairs 613 within the output data 429 and label it to assist in validating or training the classifier 109 (FIG. 1). The user data 431 applied to a sample set of record pairs 613 forms labeled record pairs 717.

The sample set of record pairs 613 may be provided to a user. The user can analyze one or more of the sampled record pairs 613 for each feature signature 412 to determine whether the user believes that the sampled record pairs 613 reflects a match or not. For each record pair, the user provides user data 431 such as a corresponding label indicating a match or no-match.

Once the labeled record pairs 717 are generated, the software application 106 may either validate the classifier 109 or to train it. To validate the classifier 109, the software application 106 may generate predictive values 723 such as "true positive," "false positive," or "false negative" by analyzing the labeled record pairs 717. FIG. 7 shows that all three sampled record pairs 613 associated with a feature signature of "TTFTF" were true positives. This implies that the classifier 109 (FIG. 1) is likely correct when classifying a record pair that yields a feature signature of "TTFTF."

As another example, the user data 431 of FIG. 7 shows that among the three sampled record pairs 613 for feature signature 412 of "FFTTF," there are two are false positives and one false negative based on analyzing the labeled record pairs 717. This implies that the classifier 109 (FIG. 1) is likely incorrect when classifying a record pair that yields a feature signature of "FFTTF" As a match. According to various embodiments, the predictive values may be used to calculate a precision value or recall value for the classifier 109 using a weight 712 for the feature signature 412. The weight 712 may be equal or proportional to the percent that a particular feature signature 412 occurs within a sample set.

In addition to validating the classifier 109, the labeled record pairs 717 may be used to train the classifier 109. Here the classifier 109 may be provided with labeled record pairs 717 to configure the classifier 109. The labeled record pairs 717 serve as ground truth that has been optimized to represent a diverse set of feature signatures where the diverse set of features has been equalized using the predetermined sample size.

Figure 8:
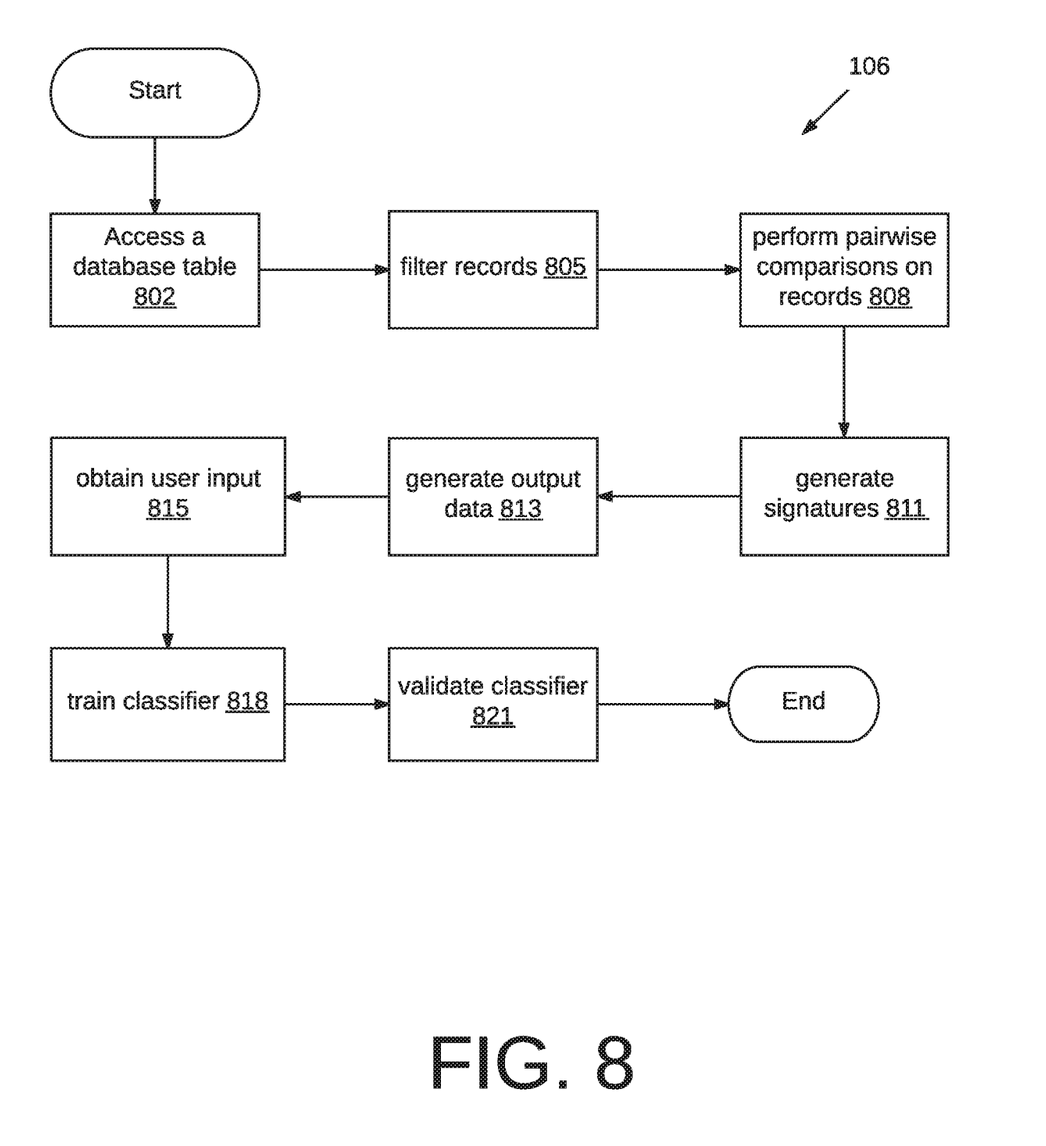
FIG. 8 is a flowchart illustrating an example of the functionality of the software application executed in a computing system 100 of FIG. 1 according to various embodiments of the present disclosure.

FIG. 8 is a flowchart that provides an example of the operation of the software application 106 according to various embodiments. It is understood that the flowchart of FIG. 8 provides merely an example of the many different types of functional arrangements that may be employed to implement the operation of the portion of the software application as described herein. As an alternative, the flowchart of FIG. 8 may be viewed as depicting an example of elements of a method implemented in the computing system 100 (FIG. 1) according to one or more embodiments.

Beginning at 802, the software application 106 accesses one or more database tables 112 (FIG. 1). Here, the software application 106 identifies a set of records 201 (FIG. 1) included within a database table. While two or more records may occupy separate lines within the database table 112, it is possible that these records represent the same real-world entity, whether it be the identity of a customer, an object, an event, or any other real-world entity. Two records that share commonalities are referred to as record pairs.

At 805, the software application 106 selects record pairs that are likely to be classified as related pairs. For example, the software application 106 may perform a series of blocking functions 310 (FIG. 3). The result is a filtered set of record pairs 315 (FIG. 3).

At 808, the software application 106 performs a number of pairwise comparisons 409 (FIG. 4) on various record pairs in a set of record pairs. Assuming a blocking operation is performed, the set of record pairs is a set of filtered record pairs 315 (FIG. 3). At 811, each pairwise comparison 409 yields a feature signature 412 (FIG. 4). The feature signature 412 is a pattern that corresponds to how a first record 403 and a second record 406 are similar. This may involve determining which features, derivative of field values, are similar or are the same.

At 813, the software application 106 generates output data 429 (FIG. 4). The output data 429 may include a comprehensive list of the calculated feature signatures 412 occurring within a set of record pairs. Moreover, the output data 429 may contain a limited number of sampled record pairs 613 (FIG. 6) that represent a particular feature signature 412. The benefit of limiting the sample size is to prevent more common feature signatures 412 from dominating the output data 429.

The output data 429 may be a file that is written to by the software application 106 as it is generating feature signatures. In this case, the software application 106 continues to write sampled record pairs 613 to the output data 429 until a predetermined sample size is reached for a given feature signature 412. This limits the amount of sampled record pairs 613 per feature signature 412 in the output data 429.

Once generated, the sampled record pairs 613 in the output data 429 may be transmitted to a user. The software application 106 may communicate with a client device over a network. For example, a user may use a personal computer, laptop, mobile device, or other computing device to interface with the software application 106. This may involve the use of an online portal. The user may download the sampled record pairs 613 onto a client.

At 815, the software application obtains user data 431 (FIGS. 4 and 7), which may include labels. A user may review the sampled record pairs 613, evaluate it, and submit user data 431 to the software application 106. For example, the user may submit user data 431 via an online portal or online form or any other mechanism to upload data within the computing system 100 (FIG. 1). The user input may label the sampled record pairs 613 as to whether they represent a match or no-match.

At 818, the software application 106 trains the classifier 109 using labeled record pairs 717 (FIG. 7). Here, the classifier 109 is provided with the sampled record pairs 613 along with user data 431, which may include corresponding labels for the sampled record pairs 613. In this respect, the labeled record pairs 717 serve as an optimized set of ground truth for classifier 109 training.

At 821, the software application 106 validates a classifier 109 (FIG. 1) using the user data 431. For example, the software application 106 may calculate a precision value or recall value for the classifier 109 using the user data 431. Moreover, the software application 106 may weight each feature signature 412 based on prevalence of the feature signature 412 within a set of record pairs. This may lead to a more accurate calculation of the precision value or recall value. For example, in FIG. 7, the feature signature 412 of "TTFTF" is the most common feature signature and therefore, the user data 431 relating to this signature will be given the most weight.

Figure 9:
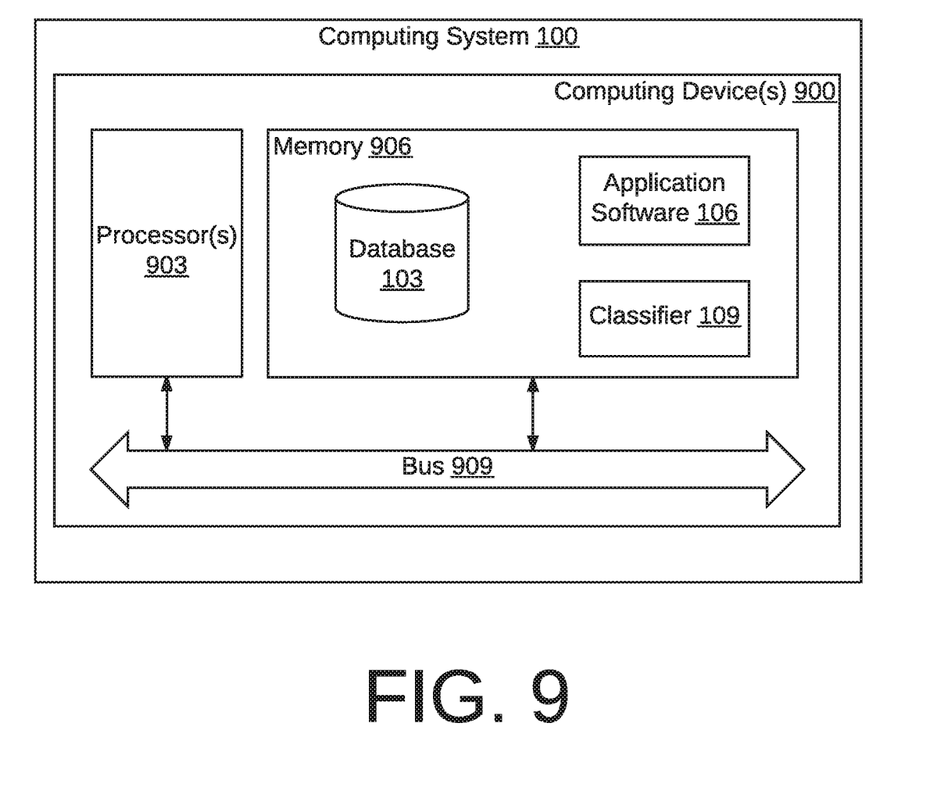
FIG. 9 is a schematic block diagram that provides one example illustration of a computing system 100 of FIG. 1 according to various embodiments of the present disclosure.

FIG. 9 shows a schematic block diagram of the computing system 100 according to an embodiment of the present disclosure. The computing system 100 includes one or more computing devices 900. Each computing device 900 includes at least one processor circuit, for example, having a processor 903 and memory 906, both of which are coupled to a local interface 909 or bus. To this end, each computing device 900 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 is the software application 106. Also stored in the memory 906 may be a database 103 and other data such as, for example, the output data 429 and user data 431. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

Several software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the software application 106 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 8 shows the functionality and operation of an implementation of the software application 106. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 903 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more boxes may be scrambled relative to the order shown. Also, two or more boxes shown in succession in FIG. 8 may be executed concurrently or with partial concurrence. Further, in some embodiments, one or more of the boxes shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The software application 106 may also comprise software or code that can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software application 106, may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 900, or in multiple computing devices in the same computing system 100. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
 a database that stores a plurality of records; and
 a memory coupled to a processor, the memory comprising
  a plurality of instructions that cause the processor to:
   perform pairwise comparisons on at least a portion of the plurality of records to generate feature signatures for the pairwise comparisons, wherein a given feature signature indicates common features between a pair of records being compared;
   classify the feature signatures using a classifier; and
   generate a list comprising a series of unique feature signatures and a set of sample record pairs for each of the unique feature signatures.

2. The system of claim 1, wherein the plurality of instructions further cause the processor to perform a plurality of blocking functions to select pairs that are likely to be classified as related pairs.

3. The system of claim 1, wherein the list further comprises respective frequencies that each unique feature signature occurs among the feature signatures.

4. The system of claim 3, wherein the plurality of instructions further cause the processor to weight each feature signature according to its corresponding frequency.

5. The system of claim 1, wherein the plurality of instructions further cause the processor to obtain user data for determining a precision value or recall value of the classifier.

6. The system of claim 5, wherein the user data comprises labels for the set of sample record pairs for each of the unique feature signatures.

7. The system of claim 1, wherein the plurality of instructions that cause the processor to perform pairwise comparisons further comprises instructions that cause the processor to determine one or more exact matches between features of a pair of records being compared.

8. A system comprising:
 a memory that stores a plurality of instructions;
 a database that stores a plurality of records; and
 a processor in data communication with the memory, the processor being configured to:
  perform pairwise comparisons on at least a portion of the plurality of records to generate feature signatures for the pairwise comparisons, wherein a given feature signature indicates a degree of similarity of features between a pair of records being compared;
  classify the feature signatures using a classifier; and
  generate a list comprising a series of unique feature signatures and a set of sample record pairs for each of the unique feature signatures.

9. The system of claim 8, wherein the processor is configured to perform a plurality of blocking functions to select record pairs that are likely classified as related record pairs.

10. The system of claim 8, wherein the classifier is a binary classifier.

11. The system of claim 8, wherein the processor is configured to obtain user data comprising user-specified labels for the set of sample record pairs for each of the unique feature signatures.

12. The system of claim 11, wherein the processor is configured to validate the classifier by determining a precision value or recall value using the user data.

13. The system of claim 12, wherein the processor is configured to:
   determine a frequency that each unique feature signature occurs by performing the pairwise comparisons on at least the portion of the plurality of records; and
   weight each feature signature according to a corresponding frequency.

14. The system of claim 13, wherein the processor is configured to determine the precision value or recall value of the classifier based on a weighted feature signature and the user data.

15. A computer implemented method comprising:
   storing a plurality of records and a plurality of features for the plurality of records in a database;
   performing pairwise comparisons on at least a portion of the plurality of records to generate feature signatures for each of the pairwise comparisons, wherein a given feature signature indicates a degree of similarity of features between a pair of records being compared;
   classifying feature signatures using a classifier; and
   generating a list comprising a series of unique feature signatures and a set of sample record pairs for each of the unique feature signatures.

16. The method of claim 15, further comprising classifying each feature signature using a binary classifier.

17. The method of claim 15, further comprising obtaining user data comprising user-specified labels for the set of sample record pairs for each unique feature signature.

18. The method of claim 17, further comprising validating the classifier by determining a precision value or recall value using the user data.

19. The method of claim 18, further comprising:
   determining a frequency that each unique feature signature occurs by performing the pairwise comparisons on at least the portion of the plurality of records; and
   weighting each feature signature according to a corresponding frequency.

20. The method of claim 19, further comprising determining the precision value or recall value of the classifier based on a weighted feature signature and the user data.

\* \* \* \* \*